(12) United States Patent
Chang

(10) Patent No.: US 9,731,886 B2
(45) Date of Patent: Aug. 15, 2017

(54) WATERPROOF ENCLOSURE FOR ELECTRONIC DEVICE

(71) Applicant: Chi-Yuan Chang, Taichug (TW)

(72) Inventor: Chi-Yuan Chang, Taichug (TW)

( * ) Notice: Subject to any disclaimer, the term of this patent is extended or adjusted under 35 U.S.C. 154(b) by 559 days.

(21) Appl. No.: 14/334,539

(22) Filed: Jul. 17, 2014

(65) Prior Publication Data

US 2016/0016716 A1    Jan. 21, 2016

(51) Int. Cl.
*B65D 81/18* (2006.01)
*B65D 33/16* (2006.01)
*A45C 13/00* (2006.01)
*H04B 1/3888* (2015.01)
*A45C 11/00* (2006.01)
*H04B 1/38* (2015.01)

(52) U.S. Cl.
CPC ............ *B65D 81/18* (2013.01); *A45C 11/00* (2013.01); *A45C 13/008* (2013.01); *B65D 33/16* (2013.01); *H04B 1/3888* (2013.01); *A45C 2011/001* (2013.01); *A45C 2011/002* (2013.01); *H04B 2001/3894* (2013.01)

(58) Field of Classification Search
CPC . B65D 81/18; A45C 13/008; A45C 2011/002; A45C 2011/003; A45C 2011/001; H04B 2001/3894; H04B 1/3888
USPC ....... 206/320; 455/575.1, 575.8; 361/679.55, 361/679.56
See application file for complete search history.

(56) References Cited

U.S. PATENT DOCUMENTS

| | | | | |
|---|---|---|---|---|
| 5,370,622 A | * | 12/1994 | Livingston | A45C 11/22 224/247 |
| 8,453,835 B2 | * | 6/2013 | So | A45C 11/00 206/305 |
| 8,958,857 B1 | * | 2/2015 | Kennard | A45C 11/00 361/679.02 |
| 2007/0215663 A1 | * | 9/2007 | Chongson | A45C 1/04 224/650 |
| 2007/0261978 A1 | * | 11/2007 | Sanderson | A45C 11/22 206/320 |
| 2010/0313485 A1 | * | 12/2010 | Kuo | A45C 5/03 49/484.1 |
| 2011/0073505 A1 | * | 3/2011 | Stiehl | G06F 1/1656 206/320 |
| 2012/0118773 A1 | * | 5/2012 | Rayner | G06F 1/1626 206/320 |
| 2012/0262618 A1 | * | 10/2012 | Weakly | A45C 11/00 348/333.01 |
| 2014/0353179 A1 | * | 12/2014 | Kim | A45C 11/00 206/37 |

(Continued)

*Primary Examiner* — Steven A. Reynolds

(57) ABSTRACT

A waterproof enclosure is provided with a bag including an internal space configured to receive an electronic device, a hole disposed at a forward end, and a sealable opening disposed at a position other than the hole wherein the internal space communicates with both the hole and the sealable opening; a flexible sleeve sealingly disposed in the hole and including an axial channel communicating with both the internal space and a space externally of the bag; and a flexible plug disposed in the channel and including an axial tunnel having a forward end and a rear end, and a crack axially extending from the forward end of the tunnel to a rear end of the tunnel and radially extending from the tunnel to a peripheral surface of the plug.

19 Claims, 8 Drawing Sheets

(56) References Cited

U.S. PATENT DOCUMENTS

2014/0360892 A1* 12/2014 Lin ..................... A45C 11/00
 206/37
2015/0230356 A1* 8/2015 Shinoda ............... G06F 1/1656
 455/575.8

* cited by examiner

WATERPROOF ENCLOSURE FOR ELECTRONIC DEVICE

BACKGROUND OF THE INVENTION

1. Field of the Invention

The invention relates to waterproof enclosures and more particularly to a waterproof enclosure for receiving a portable electronic device (e.g., cellular phone, MP3, or the like) with the plugs thereof disposed externally of waterproof enclosure.

2. Description of Related Art

There are many types of waterproof enclosure for a portable electronic device (e.g., cellular phone, MP3 or the like) commercially available. These products are designed to protect the electronic device during use in a rainy day or in the water. While these products are watertight, the cable of the electronic device is not adapted to dispose externally of the waterproof enclosure, thereby limiting its applications.

A conventional waterproof enclosure 90 is shown in FIG. 8 and includes a socket 92 at one edge and a cable 91 having one end connected to the socket 92 and the other end formed as a plug. Earbuds 93, disposed externally of the waterproof enclosure 90, have a jack at one end adapted to insert into the socket 92 for connection.

However, the conventional waterproof enclosure 90 has the following disadvantages:

It is structurally complicated and its manufacturing cost is relatively high because the plug is disposed in the waterproof enclosure 90 and the earbuds 93 are disposed externally of the waterproof enclosure 90.

Only a complimentary jack is allowed to insert into the socket 92, i.e., it is not adaptable and an adapter is required for other types of jack.

The socket 92 is exposed and thus foreign objects may accumulate in the socket 92, and the socket 92 may get rusted due to water, rain, sunlight, etc.

Thus, the need for improvement still exists.

SUMMARY OF THE INVENTION

It is therefore one object of the invention to provide a waterproof enclosure comprising a bag including an internal space configured to receive an electronic device, a hole disposed at a forward end, and a sealable opening disposed at a position other than the hole wherein the internal space communicates with both the hole and the sealable opening; a flexible sleeve sealingly disposed in the hole and including an axial channel communicating with both the internal space and a space externally of the bag; and a plug disposed in the channel and including an axial tunnel having a forward end and a rear end, and a crack axially extending from the forward end of the tunnel to a rear end of the tunnel and radially extending from the tunnel to a peripheral surface of the plug.

The above and other objects, features and advantages of the invention will become apparent from the following detailed description taken with the accompanying drawings.

DETAILED DESCRIPTION OF THE INVENTION

Figure 1:
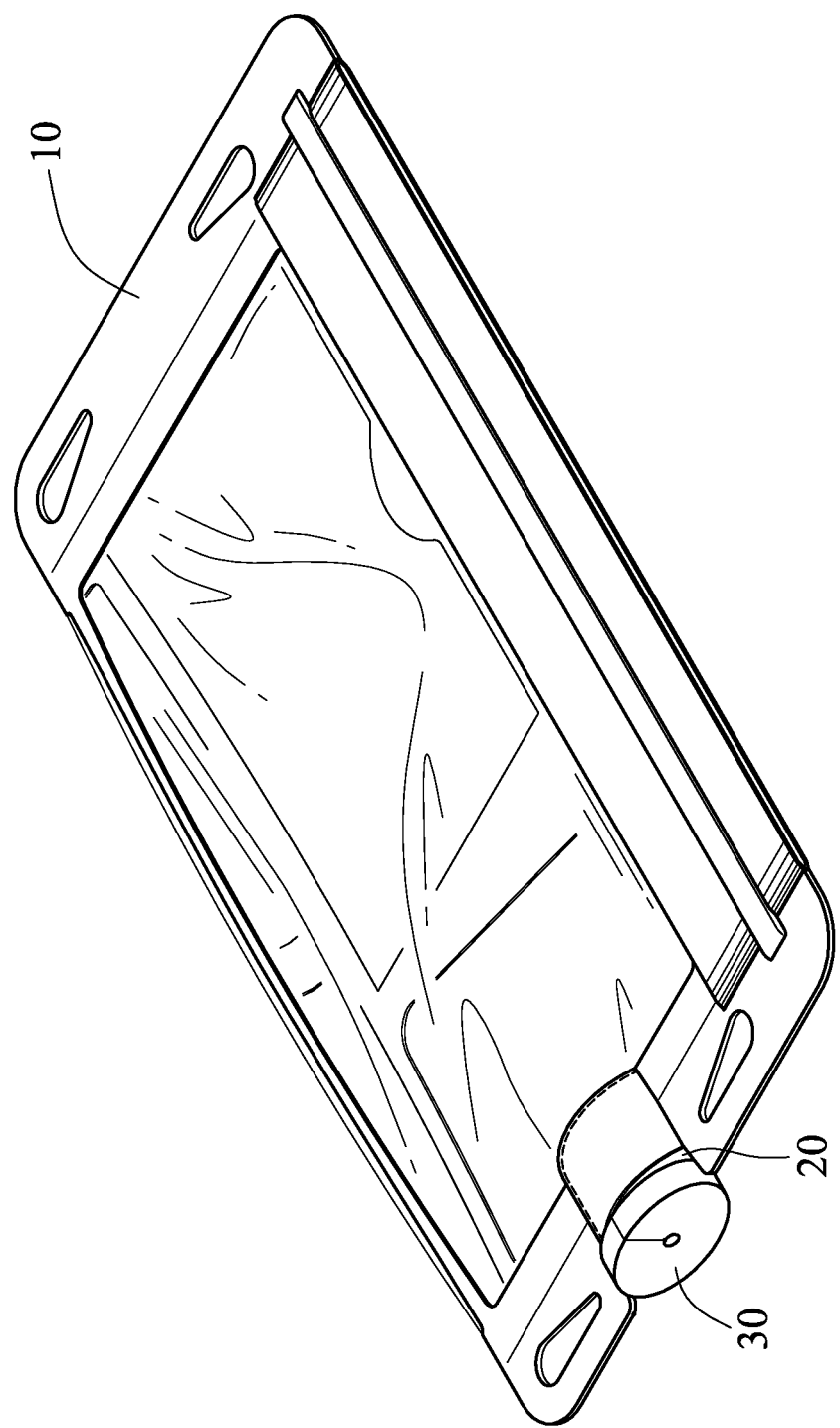
FIG. 1 is a perspective view of a waterproof enclosure for electronic device according to the invention.
Figure 2:
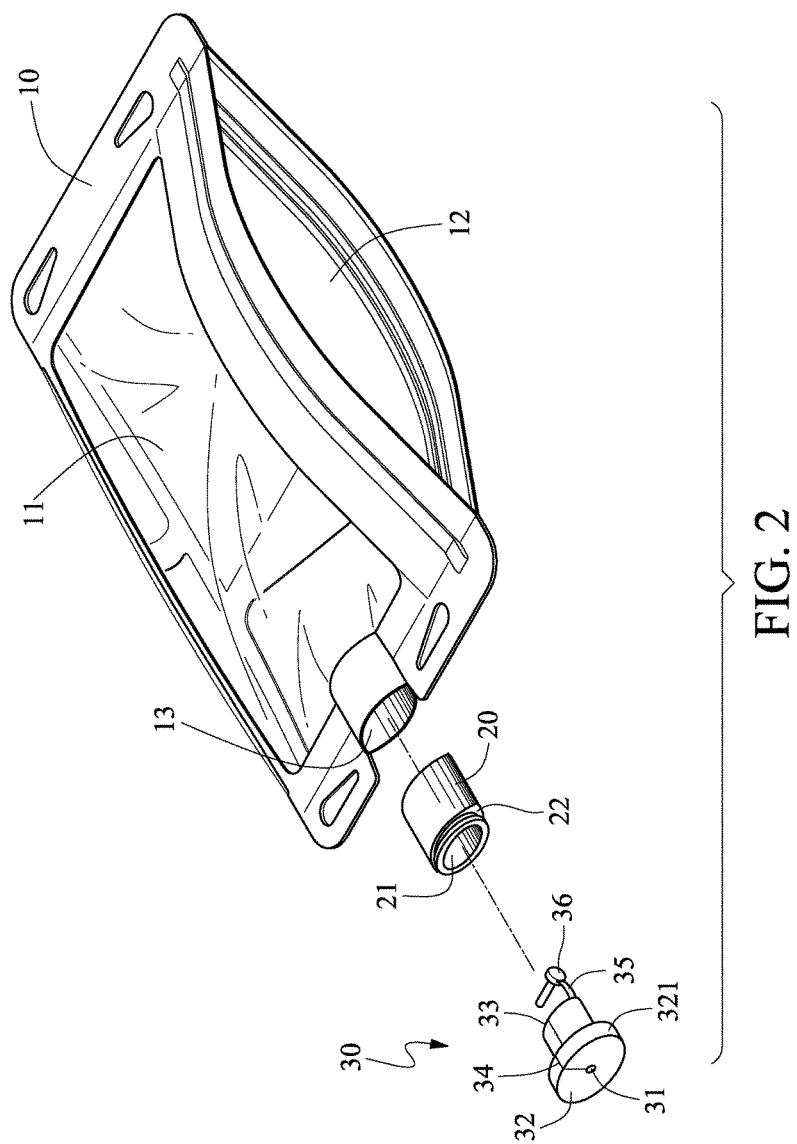
FIG. 2 is an exploded view of FIG. 1 with the enclosure being open.
Figure 3:
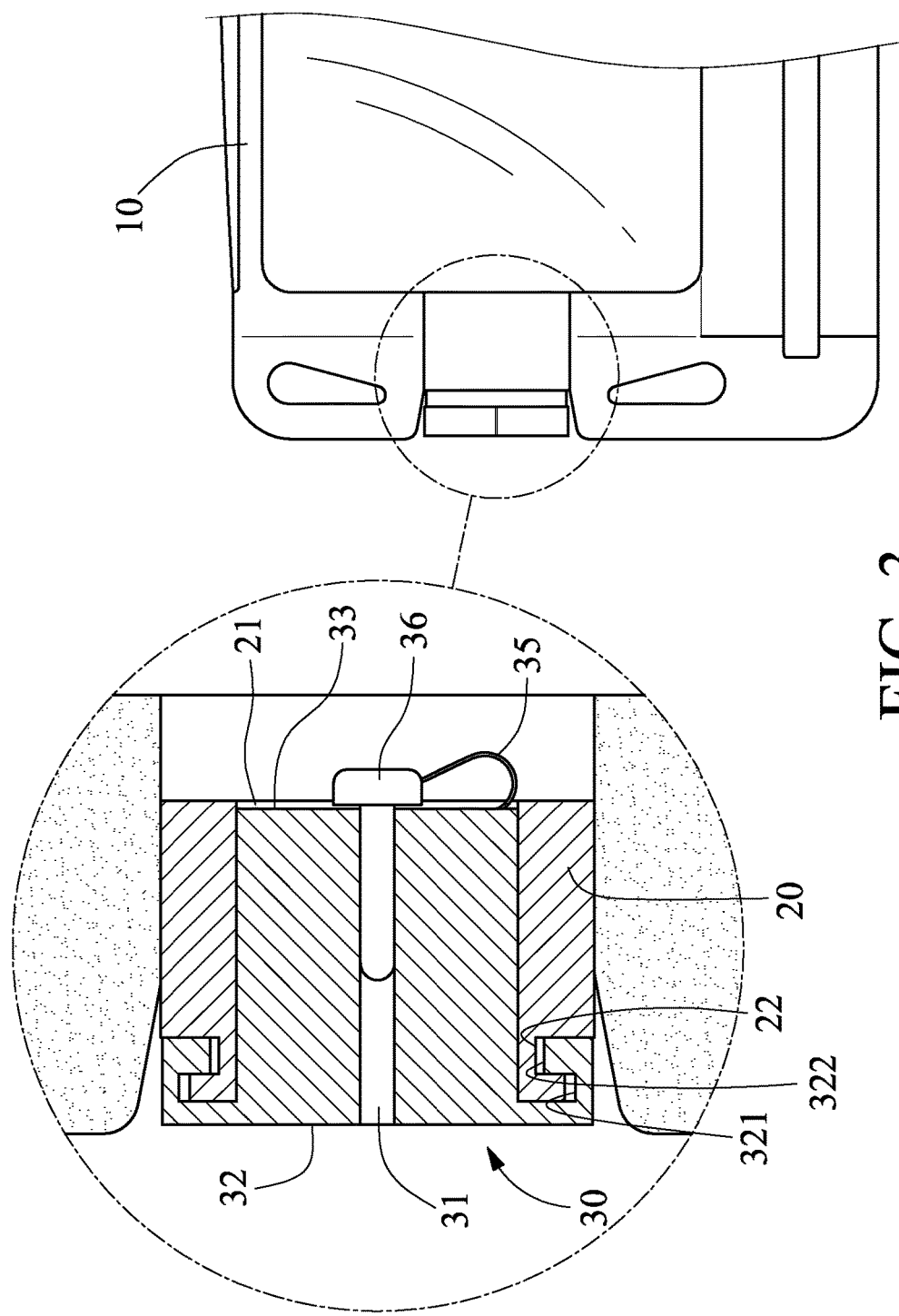
FIG. 3 is a top plan view of the left portion of FIG. 1.
Figure 4:
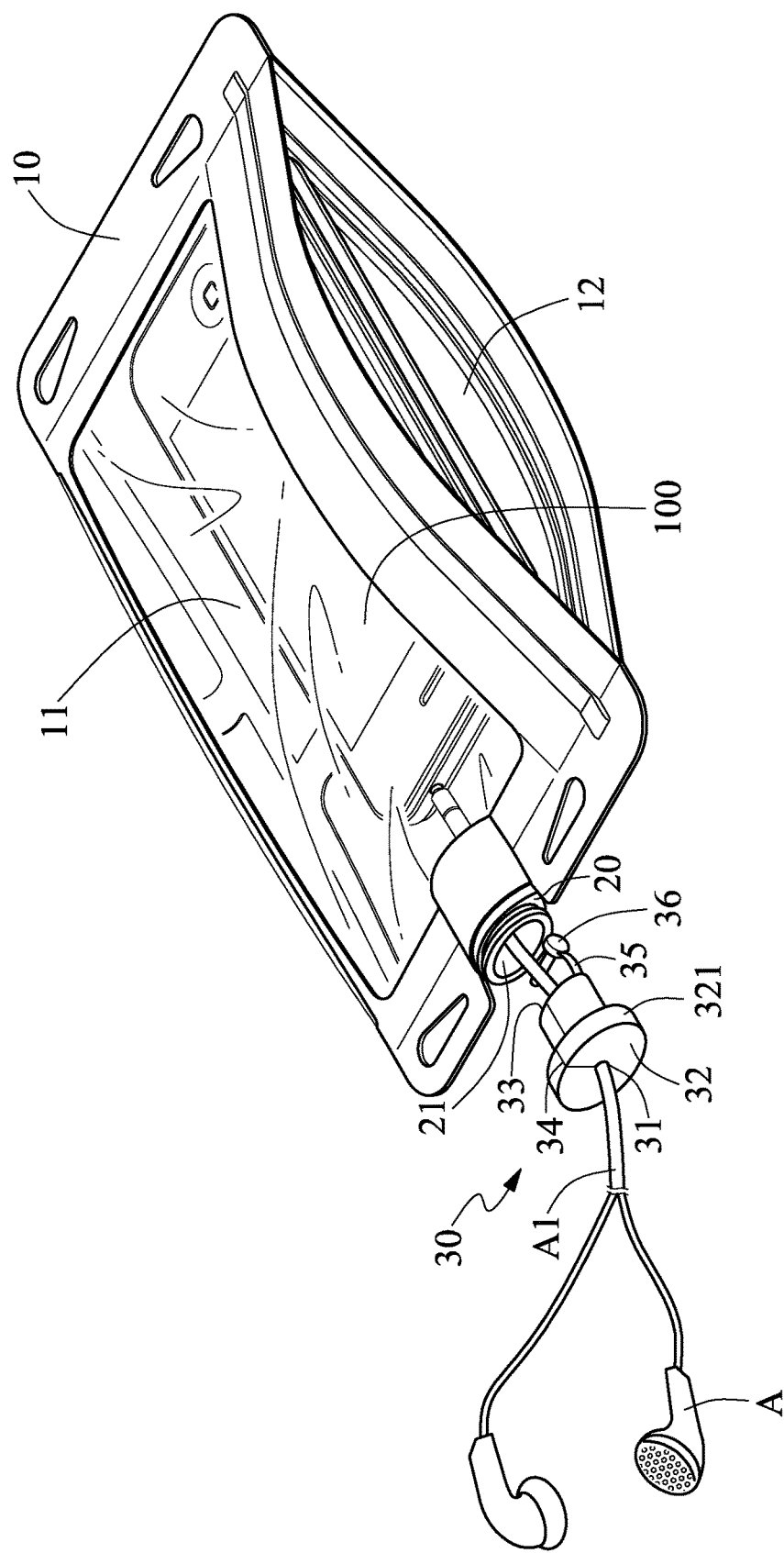
FIG. 4 is a view similar to FIG. 2 with a portable electronic device received therein and earbuds connected to the electronic device through the plug and the sleeve.
Figure 5:
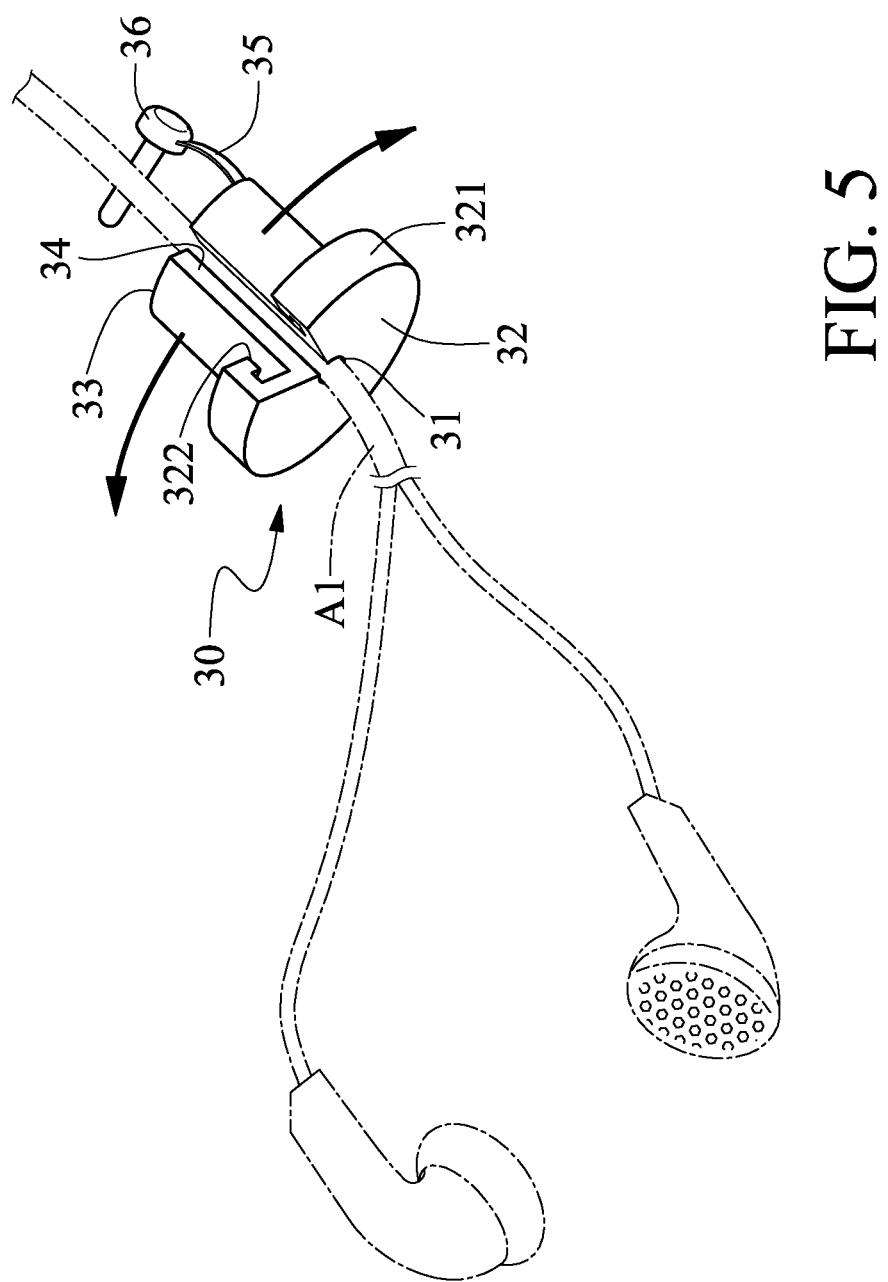
FIG. 5 is an enlarged view of the plug and the earbuds of FIG. 4
Figure 6:
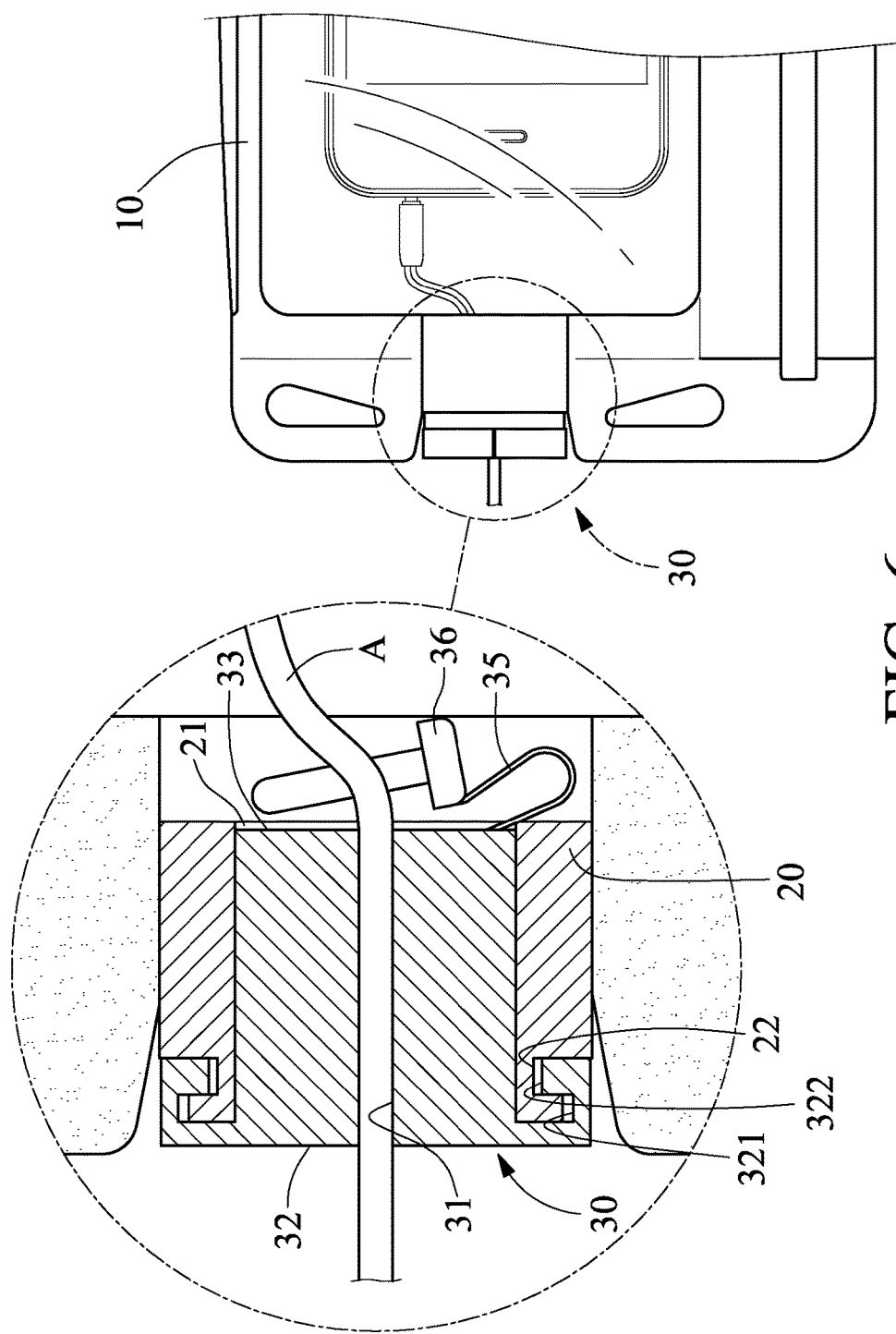
FIG. 6 is a view similar to FIG. 3.

Referring to FIGS. 1 to 6, a waterproof enclosure in accordance with the invention is shown and comprises the following components as discussed in detail below.

A bag 10 is made of waterproof material and includes an internal space 11, a sealable opening 12 on one side, and a hole 13 on a forward end.

A flexible sleeve 20 is sealingly disposed in the hole 13 and includes an axial channel 21 having an annular riser (not numbered) on an inner surface, and an annular groove 22 at a forward end. A flexible plug 30 tapered from a forward end to a rear end, i.e., the forward end of the plug 30 having a diameter greater than its rear end. The plug 30 is adapted to insert into the sleeve 20 due to flexible deformation of its material nature. The plug 30 includes an axial tunnel 31, a disc-shaped enlargement 32 at a forward end and having a rim element 321 on a forward end, and a rear annular flange 322 formed with the rim element 321, a lengthwise main body 33, a crack 34 axially extending from a forward end of the tunnel 31 to a rear end of the tunnel 31 and radially extending from the tunnel 31 to a peripheral surface of the plug 30, a band 35 having one end formed with a rear end of the main body 33, and a plugging member 36 formed with the other end of the band 35.

In a state with no portable electronic device received in the space 11, the opening 12 is closed, the sleeve 20 is fitted in the hole 13, the plugging member 36 is tightly disposed in the tunnel 31 by insertion, and the plug 30 is secured to the sleeve 20 by complimentarily engaging the flange 322 with the groove 22.

A portable electronic device (e.g., cellular phone) 100 is received in the space 11. During use in a rainy day or in the water, a user may disengage the plug 30 from the sleeve 20. Next, the user may connect one end of a cable A1 of earbuds A to the electronic device 100 and the other end thereof passing through the sleeve 20. Further, pulling the plugging member 36 out of the tunnel 31 and opening the plug 30 along the crack 34 allows the cable A1 of the earbuds A to pass through the tunnel 31. Next, a removal of the force for opening the crack 34 closes the crack 34. Next, the user may push the main body 33 of the plug 30 back into the sleeve 20 with the plug 30 secured to the sleeve 20 by complimentarily engaging the flange 322 with the groove 22. Finally, the user may close the opening 12. As a result, the earbuds A are disposed externally of the bag 10.

The earbuds A and the cable A1 can be replaced by a power cord in other embodiments.

It is envisaged by the invention that the path of the cable A1 passing through the tunnel 31 is waterproof. Thus, a user may listen to the portable electronic device 100 without worrying water flowing into the bag 10 to damage the portable electronic device 100.

Figure 7:
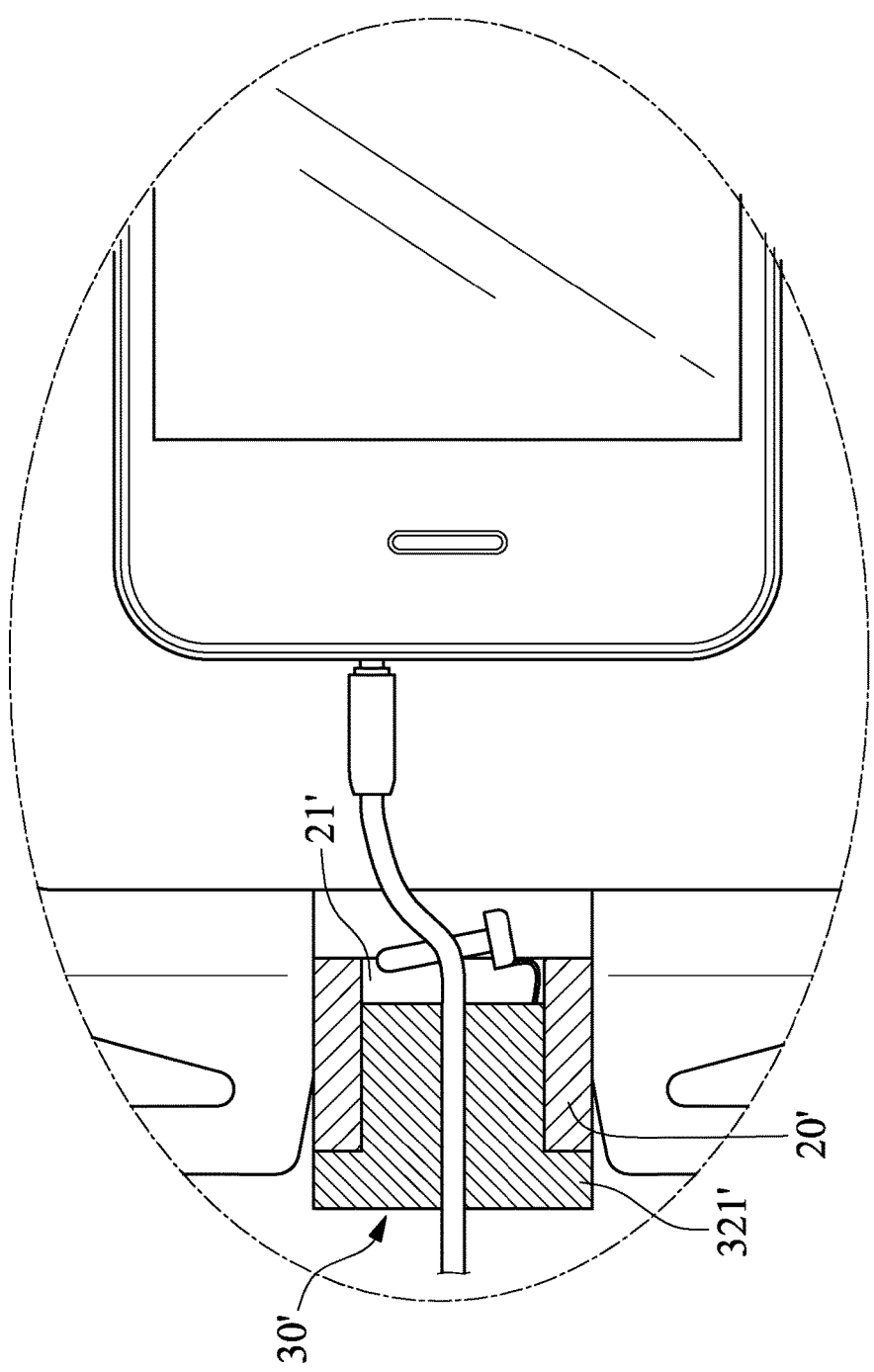
FIG. 7 is a view similar to the left portion of FIG. 6 showing another configuration of the sleeve and the plug.
Figure 8:
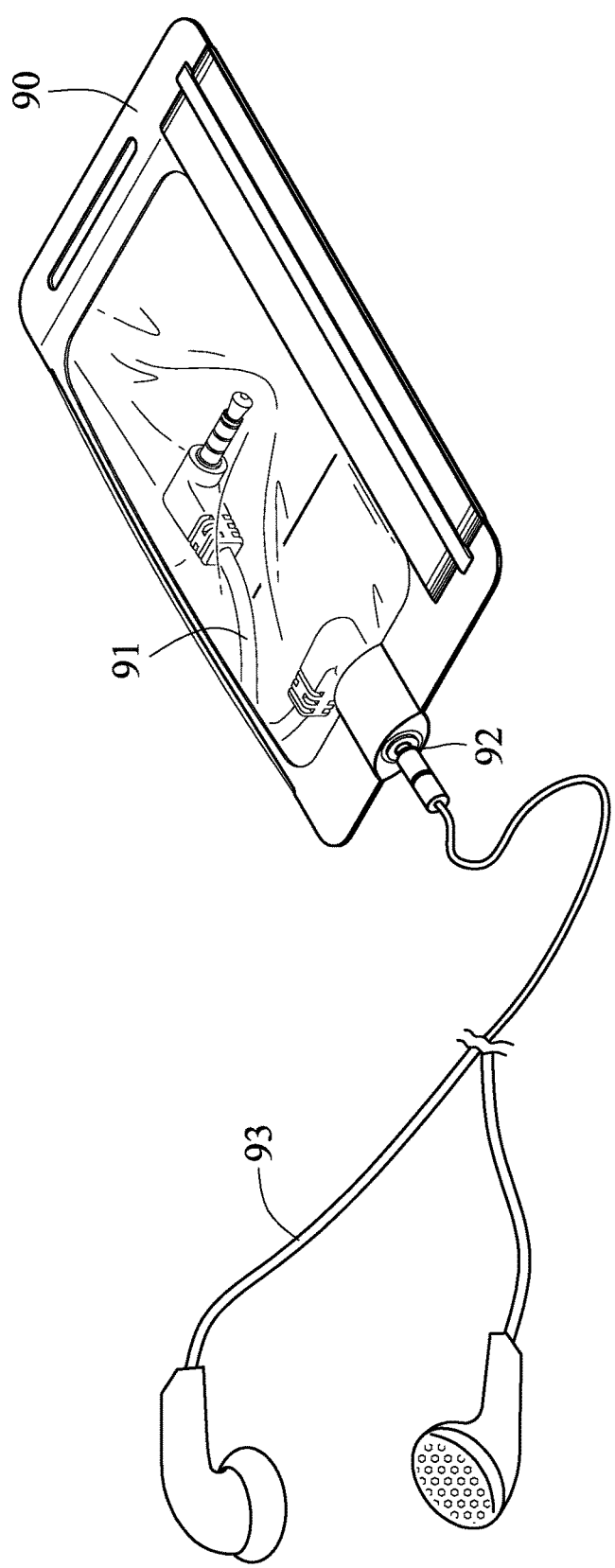
FIG. 8 is a perspective view of a conventional waterproof enclosure for electronic device.

Referring to FIG. 7, another configuration of the sleeve 20 and the plug 30 are shown. The characteristics of the configuration are detailed below. The annular groove of the sleeve 20' is removed. The annular flange 322 of the plug 30' is removed. The plug 30' is secured to the sleeve 20' by complimentarily engaging the rim member 321' with a forward end of the sleeve 20' and the main body of the sleeve 30' tightly disposed in the channel 21'.

While the invention has been described in terms of preferred embodiments, those skilled in the art will recognize that the invention can be practiced with modifications within the spirit and scope of the appended claims.

What is claimed is:

1. A waterproof enclosure comprising:
    a bag including an internal space configured to receive an electronic device, a hole disposed at a forward end, and a sealable opening disposed at a position other than the hole wherein the internal space communicates with both the hole and the sealable opening;
    a flexible sleeve sealingly disposed in the hole and including an axial channel communicating with both the internal space and a space externally of the bag; and
    a plug disposed in the channel and including an axial tunnel having an enlarged forward end and a rear end, and a crack axially extending from the forward end of the tunnel to a rear end of the tunnel and radially extending from the tunnel to a peripheral surface of the plug;
    wherein the sleeve is partially disposed externally of the bag, and the sleeve further comprises a forward annular groove disposed externally of the bag.

2. The waterproof enclosure of claim 1, wherein the forward end of the plug has a diameter greater than that of the rear end thereof.

3. The waterproof enclosure of claim 2, wherein the plug tapers from the forward end to the rear end.

4. The waterproof enclosure of claim 1, wherein the plug further comprises a forward rim member on the forward end with the crack radially passing through.

5. The waterproof enclosure of claim 1, wherein the bag is formed of a waterproof material.

6. The waterproof enclosure of claim 1, wherein the plug is formed of a flexible material and is configured to disposed in the sleeve by being flexibly deformed.

7. The waterproof enclosure of claim 1, further comprising an electrical connection line passing through the tunnel.

8. The waterproof enclosure of claim 7, wherein the electrical connection line is either a cable or a power cord.

9. The waterproof enclosure of claim 1, wherein the plug further comprises a forward rim member on the forward end with the crack radially passing through.

10. The waterproof enclosure of claim 1, wherein the plug further comprises a forward rim element on the forward end with the crack radially passing through, and a rear annular flange formed with the rim element, the flange being configured to complimentarily engage the groove.

11. A waterproof enclosure comprising:
    a bag including an internal space configured to receive an electronic device, a hole disposed at a forward end, and a sealable opening disposed at a position other than the hole wherein the internal space communicates with both the hole and the sealable opening;
    a flexible sleeve sealingly disposed in the hole and including an axial channel communicating with both the internal space and a space externally of the bag; and
    a plug disposed in the channel and including an axial tunnel having an enlarged forward end and a rear end, and a crack axially extending from the forward end of the tunnel to a rear end of the tunnel and radially extending from the tunnel to a peripheral surface of the plug;
    wherein the plug further comprises a band having one end formed with the rear end of the plug, and a plugging member formed with the other end of the band, the plugging member being configured to complimentarily dispose in the tunnel.

12. The waterproof enclosure of claim 11, wherein the sleeve is partially disposed externally of the bag.

13. The waterproof enclosure of claim 12, wherein the sleeve further comprises a forward annular groove disposed externally of the bag.

14. The waterproof enclosure of claim 13, wherein the plug further comprises a forward rim element on the forward end with the crack radially passing through, and a rear annular flange formed with the rim element, the flange being configured to complimentarily engage the groove.

15. The waterproof enclosure of claim 12, wherein the plug further comprises a forward rim element on the forward end with the crack radially passing through.

16. The waterproof enclosure of claim 11, wherein the forward end of the plug has a diameter greater than that of the rear end thereof.

17. The waterproof enclosure of claim 16, wherein the plug tapers from the forward end to the rear end.

18. The waterproof enclosure of claim 11, wherein the plug is formed of a flexible material and is configured to disposed in the sleeve by being flexibly deformed.

19. The waterproof enclosure of claim 11, further comprising an electrical connection line passing through the tunnel.

* * * * *